US007975919B2

(12) United States Patent
Haas et al.

(10) Patent No.: US 7,975,919 B2
(45) Date of Patent: Jul. 12, 2011

(54) SECURE VOTE BY MAIL SYSTEM AND METHOD

(75) Inventors: Bertrand Haas, New Haven, CT (US); Matthew J. Campagna, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 872 days.

(21) Appl. No.: 11/960,851

(22) Filed: Dec. 20, 2007

(65) Prior Publication Data

US 2009/0160174 A1 Jun. 25, 2009

(51) Int. Cl.
*G06K 17/00* (2006.01)
*G07C 13/00* (2006.01)

(52) U.S. Cl. ............................ 235/386; 235/375; 283/5

(58) Field of Classification Search ............. 235/5, 386, 235/375

See application file for complete search history.

(56) References Cited

U.S. PATENT DOCUMENTS 4,717,177 A 1/1988 Boram
5,189,288 A 2/1993 Anno et al.
6,457,643 B1 10/2002 Way
6,540,138 B2 4/2003 Hall et al.
6,817,515 B2 11/2004 Winnett
6,865,543 B2 3/2005 Gibbs, Sr.
6,991,161 B2 1/2006 Pazniokas
7,210,617 B2 5/2007 Chaum
7,216,807 B2 * 5/2007 McClure ........................ 235/386
2002/0019767 A1 2/2002 Babbitt et al.
2002/0133396 A1 9/2002 Barnhart
2003/0062411 A1 4/2003 Chung et al.
2004/0040021 A1 * 2/2004 Bharati et al. ................ 717/170
2005/0092835 A1 * 5/2005 Chung et al. .................. 235/386
2007/0007341 A1 * 1/2007 Poulin et al. .................. 235/386
2007/0248248 A1 * 10/2007 Brucker et al. ............... 382/119
2008/0230594 A1 * 9/2008 Anderson et al. ............... 235/51
2008/0308635 A1 * 12/2008 Poulin et al. .................. 235/386
2009/0127335 A1 * 5/2009 Seliger et al. ................. 235/386
2009/0322070 A1 * 12/2009 Reichelsheimer et al. ....... 283/5

* cited by examiner

*Primary Examiner* — Thien M. Le
*Assistant Examiner* — Tuyen K Vo
(74) *Attorney, Agent, or Firm* — Brian A. Lemm; Charles R. Malandra, Jr.

(57) ABSTRACT

A method of enabling a voter to vote by mail by using a secret vote code (SVC) that includes translating the SVC into a one-time code (OTC) valid only for the election, storing the OTC, and mailing to the voter a ballot, a return envelope, and a mechanism for enabling the SVC to be translated into a translated format. Further, the method includes receiving the return envelope from the voter that includes a completed ballot, the voter's signature, and the translated format, determining whether the signature obtained from the envelope matches a stored signature for the voter, obtaining a second one-time code based on the translated format and determining whether the second one-time code matches the stored one-time code. The ballot is counted only if it is determined that: (i) the signatures match, and (ii) the second one-time code matches the stored one-time code.

25 Claims, 13 Drawing Sheets

SECURE VOTE BY MAIL SYSTEM AND METHOD

FIELD OF THE INVENTION

The present invention relates to voting systems, and in particular to a vote by mail system that employs a secret vote code for voter security and vote integrity.

BACKGROUND OF THE INVENTION

In democratic countries, governmental officials are chosen by the citizens in an election. Conducting an election and voting for candidates for public office can be performed in several different ways. One such way utilizes mechanical voting machines at predetermined polling places. When potential voters enter the predetermined polling place, voting personnel verify that each voter is properly registered in that voting district and that they have not already voted in that election. Thus, for a voter to cast his vote, he or she must go to the polling place at which he or she is registered, based on the voter's residence. Another method for conducting an election and voting utilizes paper ballots that are mailed to the voter who marks the ballot and returns the ballot to the voting authority running the election through the mail. In the usual vote by mail process, the voter marks the ballot to cast his/her vote and then inserts the ballot in a return envelope which is typically pre-addressed to the voter registrar office in the corresponding county, town or locality in which the voter is registered. The voter typically appends his/her signature on the back of the envelope adjacent his/her human or machine readable identification.

When the return envelope is received at the registrar's office of the voting authority, a voting official compares the voter signature on the envelope with the voter signature retrieved from the registration file to make a determination as to whether or not the identification information and signature are authentic and valid, and therefore the vote included in the envelope should be counted. If the identification information and signature are deemed to be authentic and valid, the identifying information and signature are separated from the sealed ballot before it is handed to the ballot counters for tabulation. In this manner, the privacy of the voter's selections is maintained and thus the ballot remains a "secret ballot."

Prior art vote by mail systems suffer from a number of drawbacks. One of the main problems with vote by mail systems is the fact that voters can sell their votes. Specifically, in order to sell a vote, a voter would merely need to sign the return envelope and give it to the buyer along with the blank ballot in exchange for some money. The buyer would then complete the ballot and mail it in the signed envelope provided by the selling voter. Because the envelope includes a genuine signature, the ballot will be authenticated as a valid vote by the voting registrar. Another problem with existing vote by mail systems is that there is the potential for voters to be unduly coerced to vote in a certain way. Still another problem is due to the fact that the voter's signature is the only way in which to authenticate the voter and the ballot. As a result, a fraudster who knows a voter's signature (for instance from a check or a driver's license) may be able to divert a blank ballot intended for a voter and vote in the voter's stead.

One possible method for discouraging vote selling and/or protecting legitimate voters from coercion is to allow for a voter to return multiple ballots by mail, with only one actually being counted. With respect to vote buying, buyers would be reluctant to buy votes since a voter could potentially inconspicuously sell as many votes to as many buyers as he or she wanted, and still vote for himself or herself in such as way that only that vote would be counted. With respect to coercion, potential coercers would recognize that their coercion may not be effective, since the voter could still vote for himself or herself in such as way that only that vote would be counted.

While allowing multiple ballots may seem like a good solution to the vote buying and voter coercion problems, current legislation in many jurisdictions specify that when multiple ballots are received, the ballot to be counted is either the first one received or the last one received (depending on the jurisdiction). This gives some control to a fraudster (a buyer or coercer) to increase the chances that his or her ballot, and not another one from the legitimate voter, will be counted. For example, if the ballot to be counted is the first one to be received, the fraudster would act as early as possible, and if the ballot to be counted is the last one to be received, the fraudster would act as late as possible.

Voting by mail is becoming more prevalent (apart from the usual absentee voting), and in some jurisdictions, entire elections are being conducted exclusively by mail. Thus, there exists a need for a vote by mail system that allows a voter to cast a ballot knowing that that ballot will be the one that is counted regardless of when it is received.

SUMMARY OF THE INVENTION

In one embodiment, the present invention provides a method of enabling a voter to vote in a vote by mail election by using a secret vote code known only to the voter (and the voting authority). The method includes translating the secret vote code of the voter into a one-time code valid only for the election, and storing the one-time code. The method also includes mailing a voting package to the voter, wherein the voting package includes at least one ballot, a return envelope, and a mechanism for enabling the voter to translate the voter's secret vote code into a translated format. Further, the method includes receiving the return envelope from the voter that includes a completed ballot or ballots, the voter's signature, and the translated format of the voter's secret vote code, determining whether the voter's signature obtained from the return envelope matches a stored version of the voter's signature, obtaining a second one-time code based on the translated format obtained from the return envelope and determining whether the second one-time code matches the stored version of the one-time code, and counting the completed ballot or ballots in the election only if it is determined that: (i) the voter's signature obtained from the return envelope matches the stored version of the voter's signature, and (ii) the second one-time code matches the stored version of the one-time code.

In one embodiment, the step of obtaining a second one-time code based on the translated format comprises translating the translated format into the second one-time code. In this embodiment, the translated format may comprise a pattern provided on the return envelope, wherein the pattern is generated by the voter using the mechanism and the voter's secret vote code. Specifically, the return envelope may include a pad provided on a surface of the return envelope that has an array comprising a plurality of blocks arranged in a plurality of block rows and block columns, wherein the pattern comprises a number of the blocks that have been darkened by the voter. The voter's secret vote code may comprise a first sequence of digits, and the mechanism may include a card having a plurality of card digits provided thereon, with the card digits being arranged in an array including a plurality of card rows and a plurality of card columns. In this embodiment, the pad is transparent and ink absorbing (such as a transparent, ink absorbing paper) and is structured to receive the card underneath the pad such that each of the card digits is aligned with a respective one of the blocks. The blocks that have been darkened by the voter comprise the blocks (one from each column) that correspond to the first sequence of digits.

The method may further include generating the card for the voter including choosing an arrangement of the card digits in the array of the card digits, and the step of translating the secret vote code of the voter into a one-time code may include using the arrangement of the card digits and the secret vote code of the voter to generate the one-time code.

Preferably, when the return envelope is mailed to the voter, the card is provided underneath the pad. When the return envelope is received from the voter, the card will have been removed from underneath the pad by the voter.

The return envelope may include a flap having a transparent window structured to cover the translated format of the voter's secret vote code when the return envelope is closed. The return envelope may also include a signature pad on which the voter's signature is provided, and the return envelope may include a flap structured to obscure the pad and the voter's signature under certain predetermined conditions so as to protect the signature during mailing.

In another particular embodiment, the voter has a voter serial number, and the method further includes generating a voter identification number from the voter serial number that is valid only for the election. In this embodiment, the stored version of the voter's signature and the stored version of the one-time code are stored in association with the voter identification number, and the return envelope received from the voter includes the voter identification number. The voter identification number is obtained from the return envelope and used to access the stored version of the voter's signature and the stored version of the one-time code.

In another embodiment, the translated format is the second one-time code itself, in which case the step of obtaining the second one-time code based on the translated format obtained from the return envelope comprises obtaining the second one time code directly from the return envelope. In this embodiment, the translating mechanism comprises a key for translating the voter's secret vote code directly into the second one-time code. The key may map each one of a first set of digits associated with the voter's secret vote code to a corresponding one of a second set of digits associated with the second one-time code. In such a case, the step of translating the secret vote code of the voter into a one-time code comprises using the key and the secret vote code of the voter to generate the one-time code.

In another embodiment, the invention provides a return envelope for enabling a voter having a secret vote code to return a completed ballot in a vote by mail election. The return envelope includes a signature pad on which the voter may provide a signature, and a mechanism for enabling the voter to translate the voter's secret vote code into a translated format which may be used by a voting authority to obtain a one-time code valid only for the election, wherein the one-time code matches a stored one-time code stored by the voting authority and obtained by the voting authority from the voter's secret vote code. The translated format may comprise a pattern provided on the return envelope, wherein the mechanism enables the voter to generate the pattern based on the voter's secret vote code. Furthermore, the mechanism may include a pad provided on a surface of the return envelope, wherein the pad has an array comprising a plurality of blocks arranged in a plurality of block rows and block columns, and wherein the voter generates the pattern by darkening a number of the blocks. The voter's secret vote code may comprise a first sequence of digits, and the translating mechanism may further include a card having a plurality of card digits provided thereon, wherein the card digits are arranged in an array including a plurality of card rows and a plurality of card columns. In this embodiment, the pad is transparent and ink absorbing and is structured to receive the card underneath the pad such that each of the card digits is aligned with a respective one of the blocks. Thus, when the voter generates the pattern by darkening a number of the blocks, the blocks that have been darkened by the voter comprise one block from each block column, wherein the one block from each respective block column is aligned with a card digit that is the same as a respective one of the digits of the first sequence of digits. Preferably, the pad is structured to enable the card to be removed from underneath the pad by the voter. The return envelope may further include a flap having a transparent window structured to cover the translated format of the voter's secret vote code when the return envelope is closed, wherein the flap is structured to obscure the pad and the voter's signature under certain predetermined condition when the return envelope is closed.

In addition, the voter may have a voter serial number, wherein the return envelope includes a voter identification number generated from the voter serial number that is valid only for the election.

In another embodiment, the translated format is the one-time code. In this embodiment, the mechanism comprises a key for translating the voter's secret vote code into the one-time code, wherein the key maps each one of a first set of digits associated with the voter's secret vote code to a corresponding one of a second set of digits associated with the one-time code.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

The present invention provides a vote by mail system which employs a secret vote code (SVC) known only to the voter to verify that a ballot is legitimate and should be counted and that thus allows a voter to cast a ballot knowing that that ballot will be the one that is counted regardless of when it is received. Specifically, and as described in greater detail elsewhere herein, at registration time, each voter will establish their SVC at that same time that they provide other pertinent information to the voting registration authority, such as, without limitation, their name, address, phone number, signature, etc. In the preferred embodiment, the voter must do so in person with a photo ID. Also in the preferred embodiment, the SVC consists of a 4 digit number, and for illustrative purposes, such an SVC will be used in the present description. It should be understood, however, that this is meant to be exemplary only, and that the SVC may take on other forms without departing from the scope of the present invention.

According to an aspect of the present invention, the SVC is translated into a one-time code (OTC) valid only for a single particular election, which OTC is then used by the voting authority to verify that a ballot is legitimate. FIGS. 1-8 illustrate a return envelope 100 that may be used in one particular embodiment of the vote by mail system of the present invention. As described in greater detail below, the return envelope 100 provides a translating mechanism for translating the voter's SVC into an intermediary form, referred to as a one-time pattern (OTP), which may subsequently be translated into the OTC for verification purposes.

Figure 1:
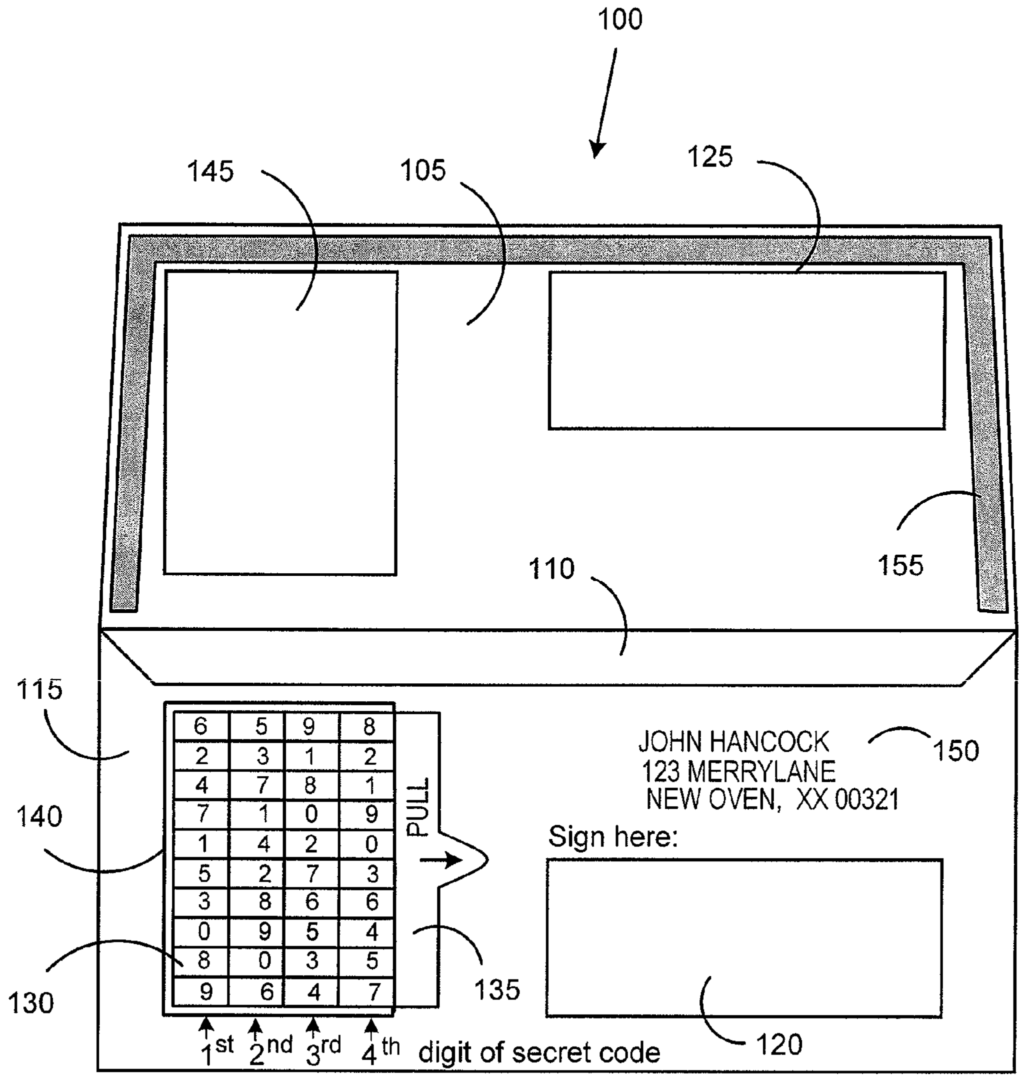
FIGS. 1-7 illustrate a return envelope that may be used in one particular embodiment of the vote by mail system of the present invention.
Figure 2:
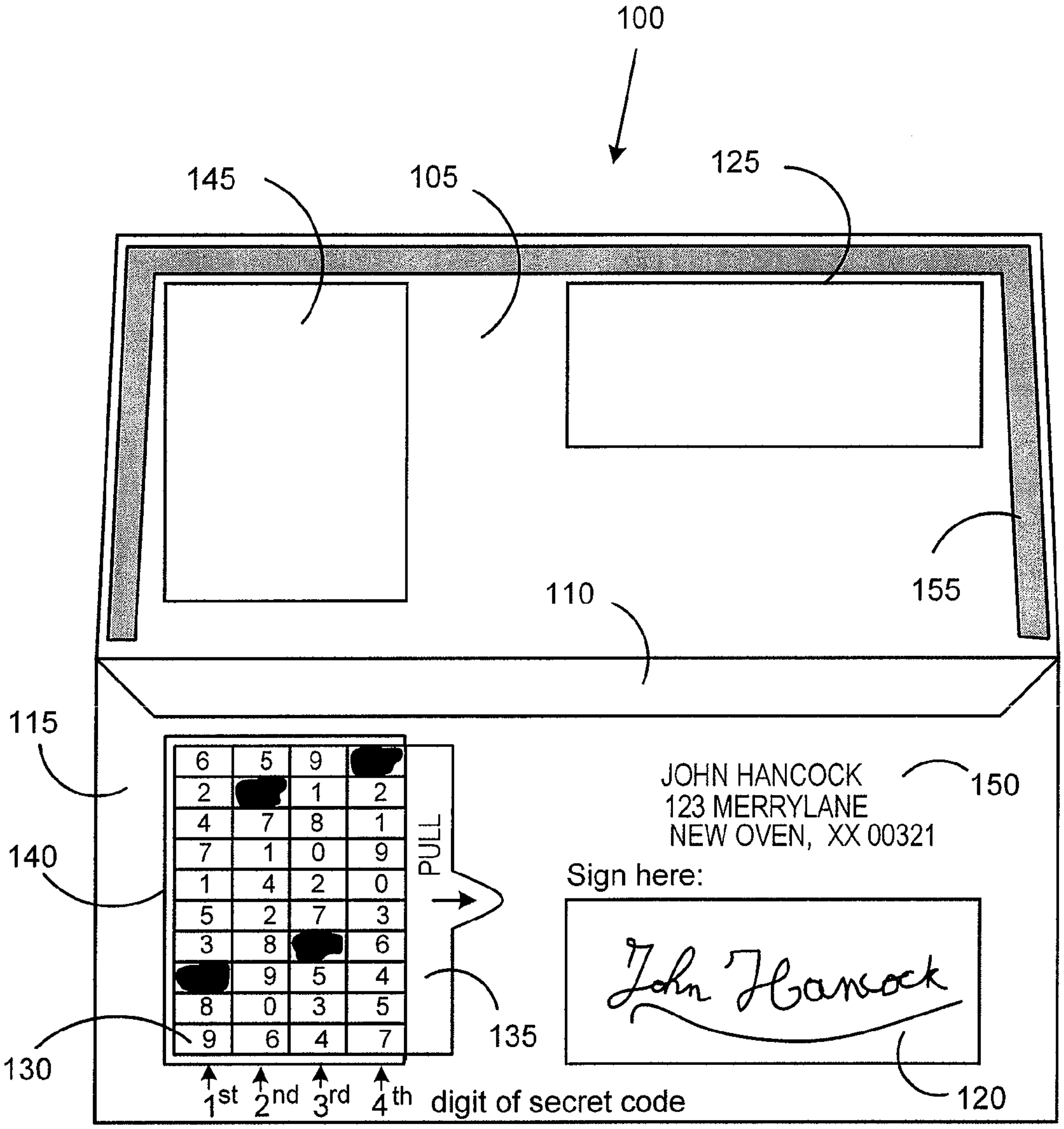
Figure 6:
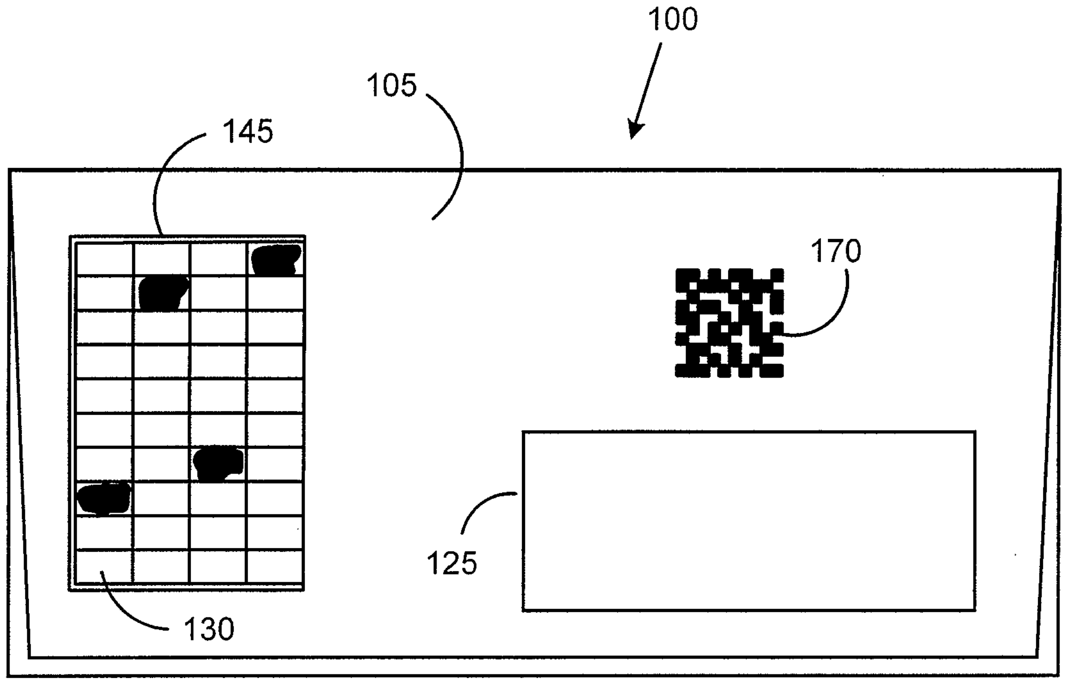

The return envelope 100 includes a flap 105, an interior 110 and a back 115. The back 115 includes a signature pad 120 on which the voter is to provide his or her signature (FIG. 2). Also provided on the back 115 of the return envelope 100 is a translating mechanism 140 which includes an SVC-pad 130 into which a ciphercode card 135 is inserted. In particular, the SVC-pad 130 is made out of a transparent material, such as, without limitation, transparent paper, that absorbs ink and is provided with an array consisting of a number of blocks arranged in a 10×4 pattern. The SVC-pad 130 is attached to the back 115 of the return envelope 100 at the top left, and bottom sides of the SVC-pad 130, leaving the right side unattached so as to form a pocket between the SVC-pad 130 and the back 115 that is structured to receive the ciphercode card 135 as shown in FIG. 1. The flap 105 also includes a window 125 and a window 145. The window 125 is structured to cover the signature pad 120 when the return envelope is closed (FIG. 6) and is preferably made of a material which is opaque under certain conditions (such as visible light) to thereby hide the signature provided on the signature 120 when, for example, the return envelope 100 is being returned in the mail, and transparent under other conditions (such as ultraviolet light) in order to allow the signature provided on the signature pad 120 to be selectively read as described in, for example, co-pending application Ser. No. 11/641,207, assigned to the assignee hereof. The window 145 is transparent, such as a window made from a plastic material, and is structured to cover the SVC-pad 130 when the flap 105 is closed (FIG. 6).

Figure 3:
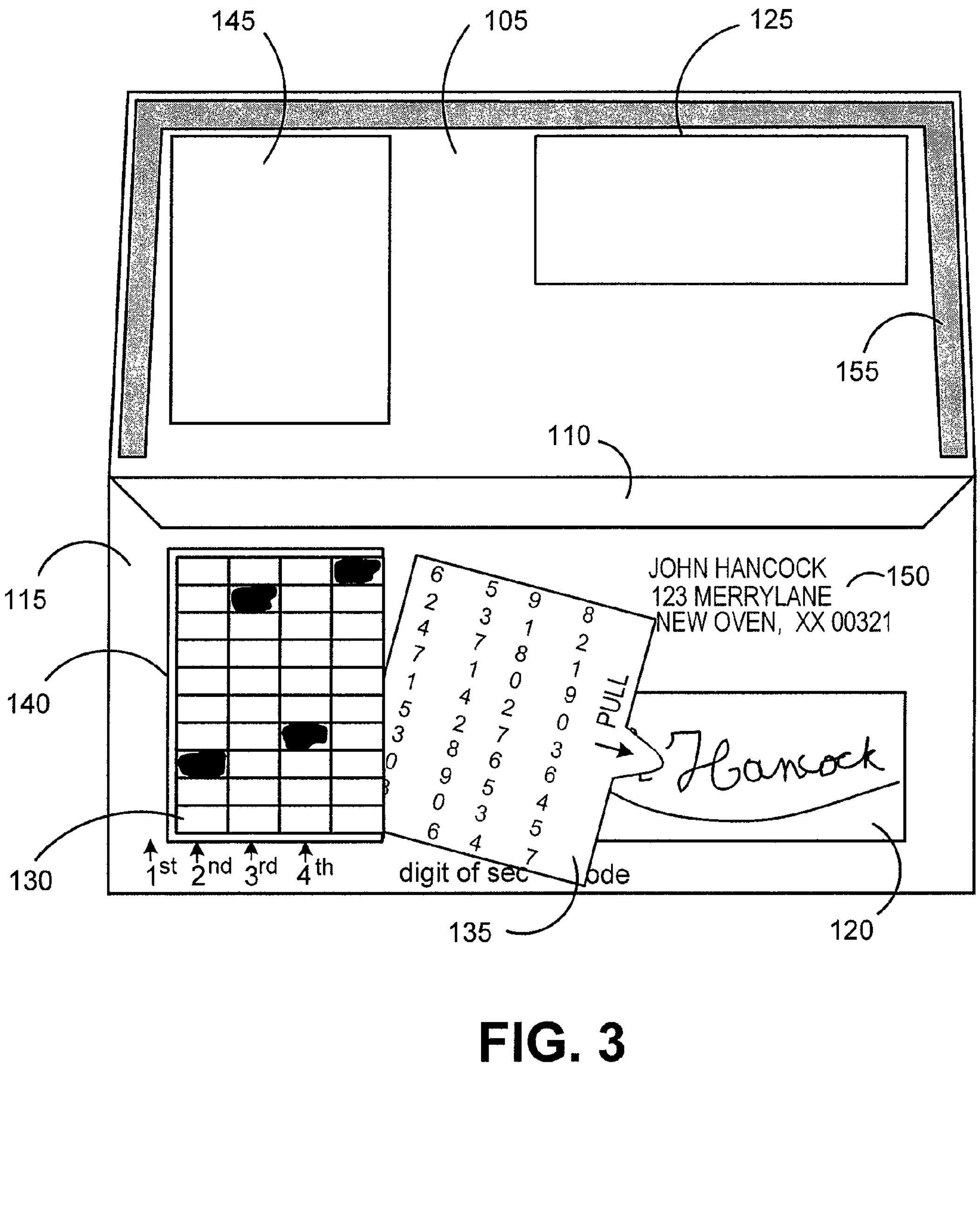
Figure 4:
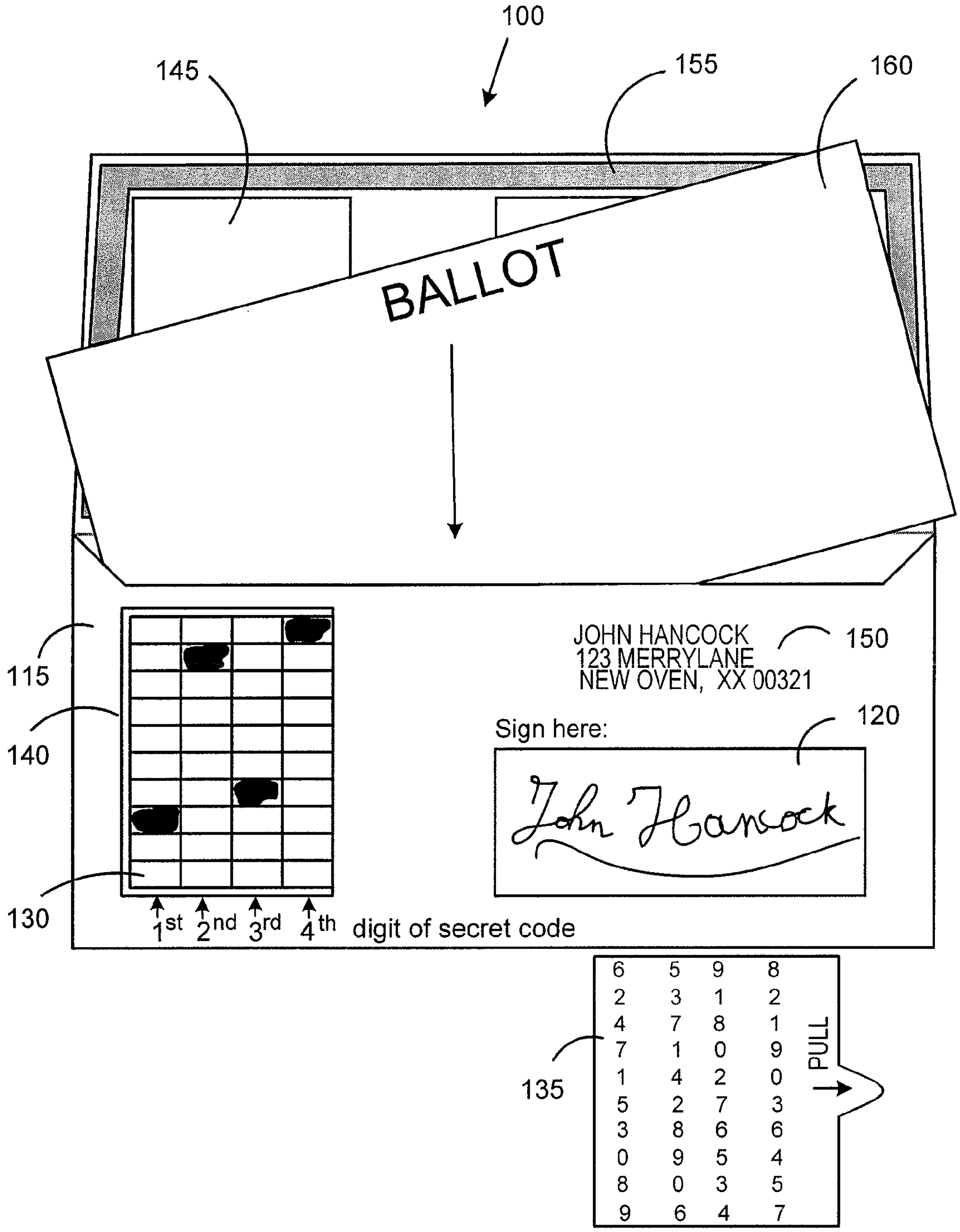

As seen most readily in FIGS. 3 and 4, the ciphercode card 135 is a removable, thin piece of material, such as cardboard, on which four columns of scrambled digits 0-9 are provided in a manner such that, when the ciphercode card 135 is inserted underneath the SVC-pad 130, each of the digits will be contained within one of the blocks of the array provided on the SVC-pad 130 (FIGS. 1 and 2). As described elsewhere herein, the ciphercode card 135, and in particular the arrangement (array) of the digits provided thereon, is uniquely generated for each voter, the significance of which is described elsewhere herein. Using the translating mechanism 140, a voter is able to translate his or her SVC into a one-time pattern, the OTP, on the array of the SVC-pad 130 by darkening the array blocks of the SVC-pad 130 corresponding to the digits of his or her SVC as shown in FIG. 2. In particular, in the example shown in FIG. 2, the voter's SVC is 0368, and thus the voter has darkened the block in the first column of the array of the SVC-pad 130 that includes the number 0, the block in the second column of the array of the SVC-pad 130 that includes the number 3, the block in the third column of the SVC-pad 130 that includes the number 6, and the block in the fourth column of the SVC-pad 130 that includes the number 8.

Figure 5:
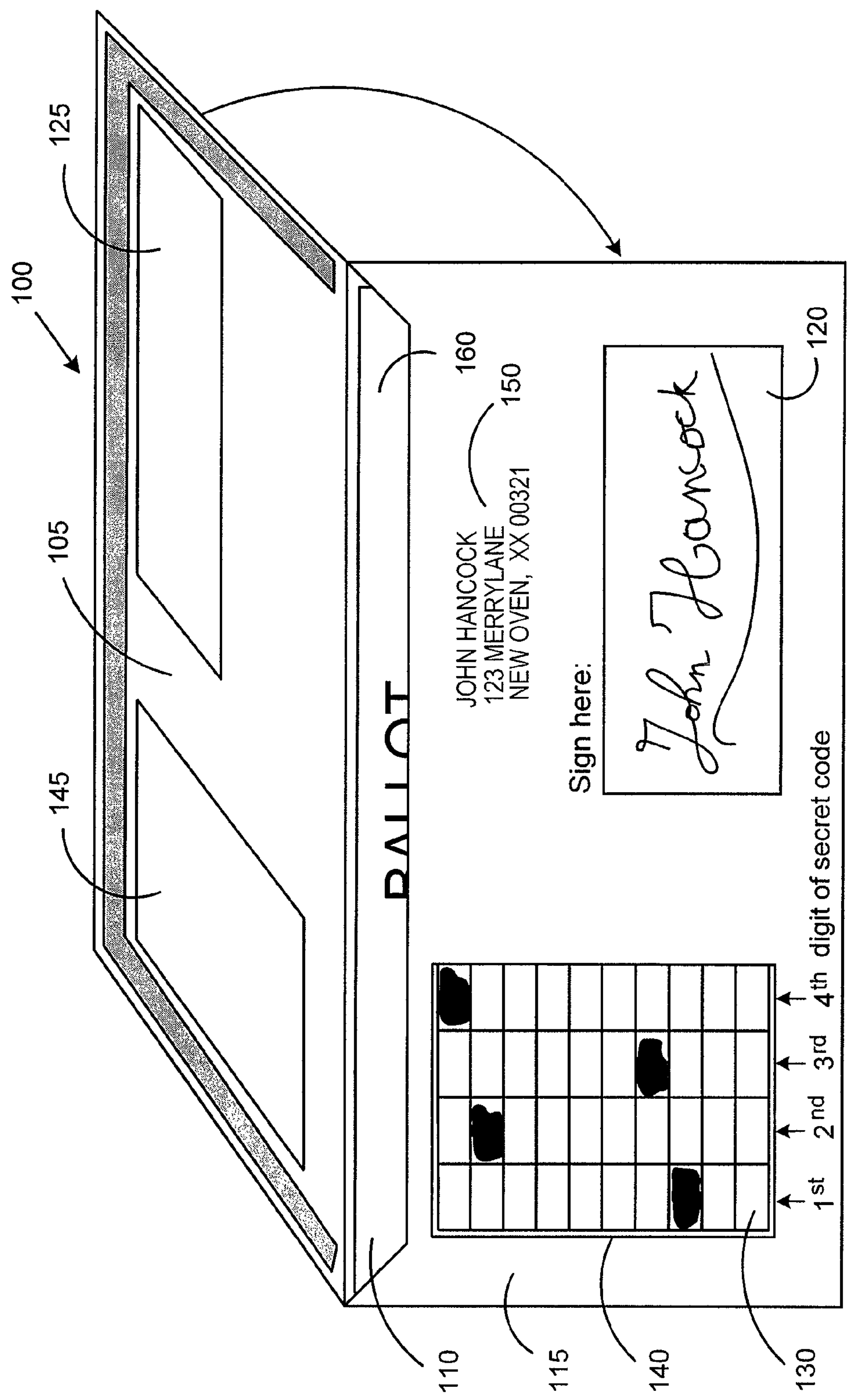
Figure 7:
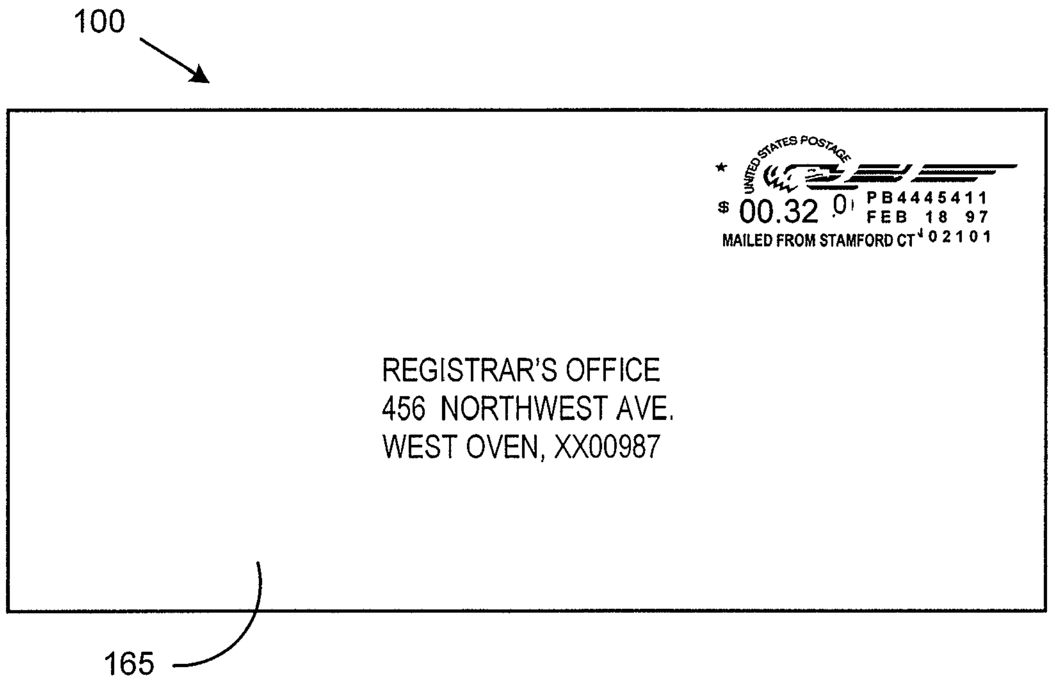

As described elsewhere herein, upon receiving a ballot 160 (FIGS. 4 and 5) in the mail along with the return envelope 100, the voter completes the ballot 160, signs the signature pad 120 and darkens the appropriate blocks of the array of the SVC-pad 130 as just described. The voter then removes the ciphercode card 135 as seen in FIG. 3, (the ciphercode card 135 may be discarded or retained as a souvenir), inserts the ballot 160 into the interior 110 of the return envelope 100 as shown in FIG. 4, and closes the flap 105 of the return envelope 100 as seen in FIG. 5. As seen in FIG. 1, the flap 105 includes an adhesive 155 which enables the flap 105 to be sealed shut when closed in the manner shown in FIG. 5. In addition, the back 115 of the return envelope 100 includes the name and address of the voter 150 above the signature pad 120. After the voter has closed and sealed the flap 105, the return envelope 100 will appear as shown in FIGS. 6 and 7. In particular, as seen in FIG. 6, the window 125 will cover the signature pad 120 and the signature provided thereon in a manner which prevents the signature from being read, and the window 145 will cover the SVC-pad 130 in a manner which allows the darkened blocks of the array of the SVC-pad 130 to be read through the window 145. In addition, a voter identification number (VIN) 170, as described elsewhere herein, is provided on the outside of the flap 105 above the window 125. Preferably, the VIN 170 is, according to an aspect of the present invention, a transformed form of a voter serial number which is assigned to the voter at the time of registration. The VIN 170 is in a format which is usable only for the particular election being conducted. This can be done, for instance, by generating an election specific random sequence and appending it to the voter serial number of each voter and hashing the results, thereby producing a VIN 170 for each voter. In the embodiment shown in FIG. 6, the VIN 170 is provided in the form of a two-dimensional barcode. FIG. 7 shows the front 165 of the return envelope 100, which includes the address of the registrar's office to which the ballot 160 is to be returned.

Figure 8:
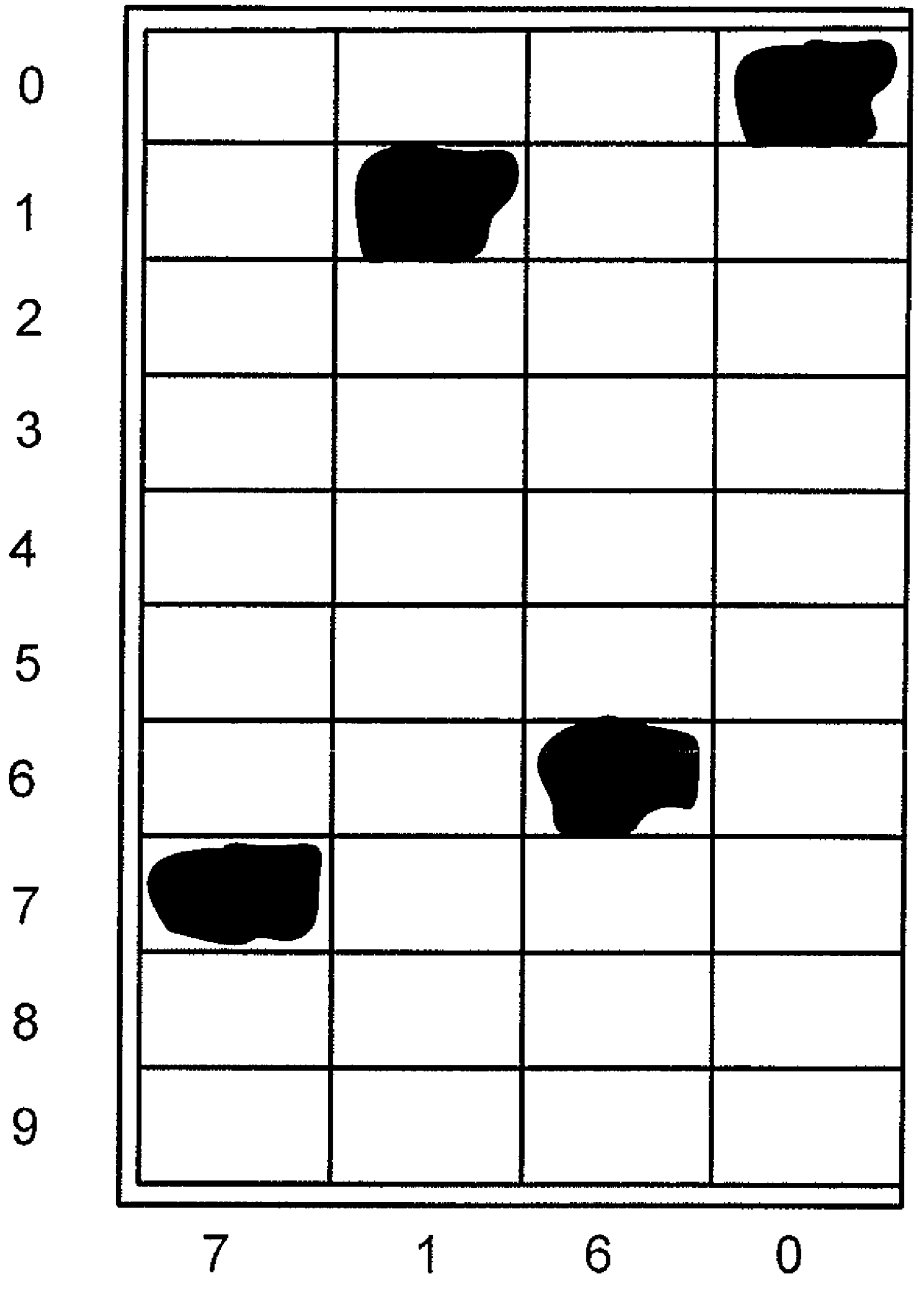
FIG. 8 is a schematic illustration showing one particular embodiment of the manner in which a one-time pattern (OTP) may be translated into a one-time code (OTC) that corresponds to the voter's secret vote code (SVC) for an election conducted according to an embodiment of the present invention.

FIG. 8 is a schematic illustration showing one particular embodiment of the manner in which an OTP (resulting from particular blocks of the array of the SVC-pad 130 being darkened) may be translated into the OTC that corresponds to the voter's SVC for this election. Specifically, as seen in FIG.

8, each block in each column of the array of the SVC-pad 130 is numbered with a digit from 0 to 9, such as consecutively from 0 to 9. Thus, each darkened block of the SVC-pad 130 can be translated into a specific digit 0 to 9. In the example being shown in FIGS. 1-8, the OTC that is generated in this manner, which is 7160, corresponds to the voter SVC of 0368.

The voting system according to the present invention (which preferably utilizes the return envelope 100) will now be described in detail. In one particular embodiment, the vote by mail system of the present invention employs the following five main authorities (the functions of which may be performed by a single entity or a number of different sub-entities of a single entity): (1) the central voter registration authority (CVRA), which maintains a central voter registration database (CVRD), (2) a ballot sending authority (BSA), which maintains a ballot sending database (BSD), (3) a voters verifying authority (VVA), which maintains a voters verifying database (VVD), (4) a vote counting authority (VCA), which builds a vote count database (VCD) containing a count of all of the votes received in the election, and (5) an election forensic authority (EFA), which maintains an election forensic database (EFD).

As described elsewhere herein, at the time that each voter registers, the voter will establish their SVC and will provide certain other pertinent personal information to the CVRA, such as, without limitation, name, address, and phone number. The voter will also provide his or her signature at this time. In addition, at this time, the voter can select a voter serial number (VSN), or alternatively and more preferably, the CVRA will assign to the voter a VSN. The CVRD maintained by the CVRA will include for each registered voter the personal information provided at registration, the voter serial number, the SVC, and the registration signature (preferably in the form of an electronic image of the signature).

When a particular election is to be held, the CVRA will perform a number of operations before the start of the voting process. First, it transforms the VSN of each voter into a VIN that is usable only for that election. As described elsewhere herein, this can be done, for example, by generating an election specific random or pseudorandom sequence and appending that sequence to each VSN and thereafter hashing the results to create the VINs. In addition, the CVRA produces, for each voter, a ciphercode card 135 that is particular to that voter. Furthermore, using the ciphercode card 135 information generated for each voter (i.e., the arrangement of the digits in the array of the ciphercode card 135), the CVRA will translate each voter's SVC into the corresponding OTC and save that corresponding OTC in the CVRD.

The CVRA will also transmit to the BSA the following information for each registered voter: (1) the voter's name and address, the ballot type to be received by the voter, the voter's VIN, and the details of the ciphercode card 135 (i.e., the order in which each of the digits is to appear in the ciphercode card 135 so that the actual physical ciphercode card 135 may be generated by the BSA). This information, when received by the BSA, is stored in the BSD. The CVRA also sends the following information for each registered voter to the VVA: the voter's VIN, the voter's OTC and the voter's registration signature (e.g., in the form of an electronic image of the signature). The VVA stores this information in the VVD. Finally, the CVRA transmits the following information to the EFA for each of the registered voters: the name, address and phone number of the voter, and the VIN of the voter.

Figure 9:
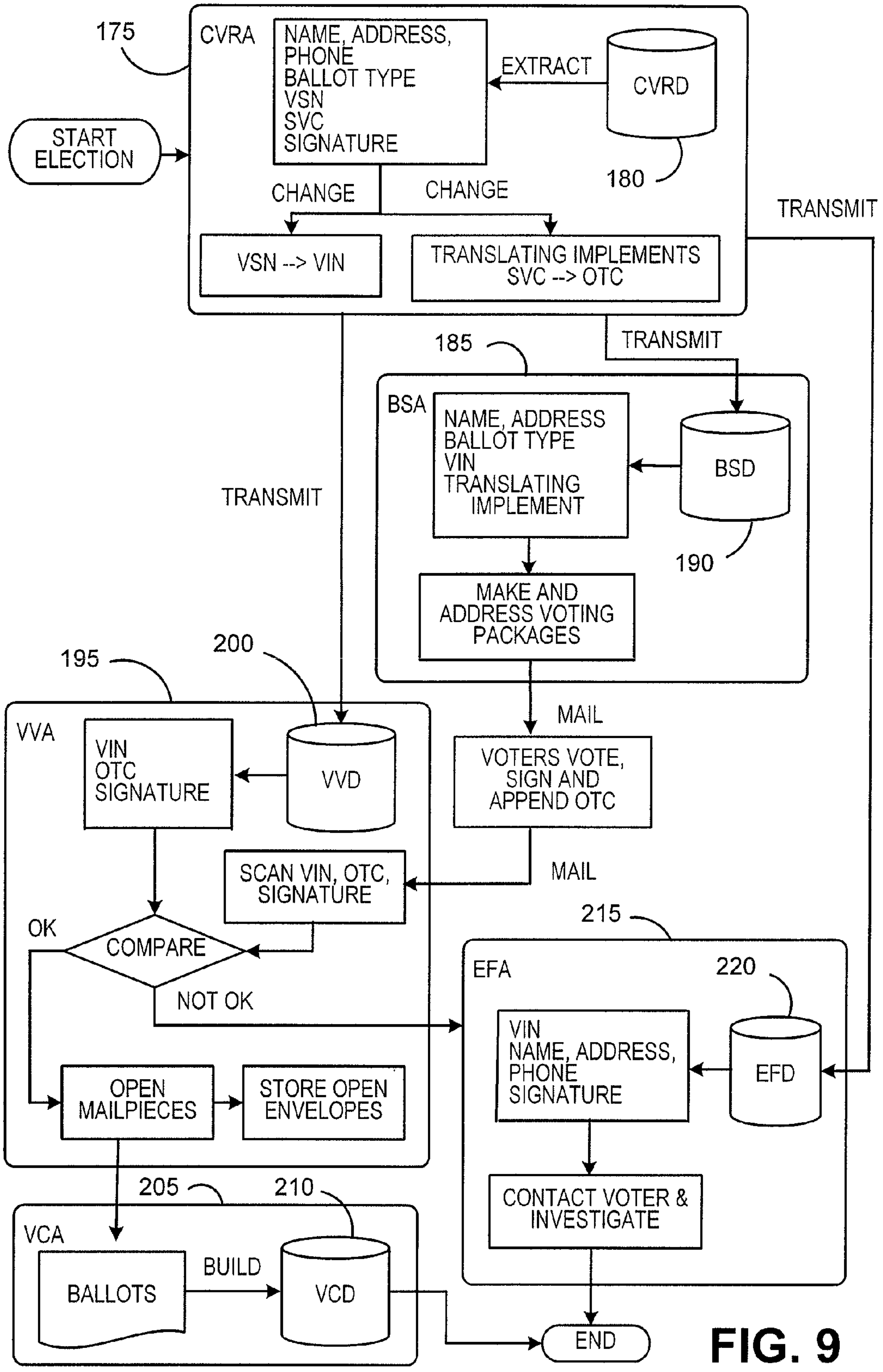
FIG. 9 is a schematic illustration of the operation of the vote by mail system according to an embodiment of the invention.

Next, the BSA performs a number of operations in order to generate an appropriate return envelope 100 for each registered voter. First, it prints the VIN 170 and the name and address 150 of each voter on a return envelope 100. It then generates a ciphercode card 135 for each voter based on the information that it received from the CVRA and stored in the BSD. Next, it inserts the ciphercode card 135 for each voter beneath the SVC-pad 130 of the return envelope 100 generated for the voter. It then creates a voting package for each voter, which includes the appropriate ballot type or types and the return envelope 100 created for the voter, and addresses them and mails them to each voter at the appropriate address. The operations just described are shown schematically in FIG. 9, wherein the CVRA is represented by the reference numeral 175, the CVRD is represented by the reference numeral 180, the BSA is represented by the reference numeral 185, the BSD is represented by the reference numeral 190, the VVA is represented by the reference numeral 195, the VVD is represented by the reference numeral 200, the VCA is represented by the reference numeral 205, the VCD is represented by the reference numeral 210, the EFA is represented by the reference numeral 215 and the EFD is represented by the reference numeral 220.

Figure 10:
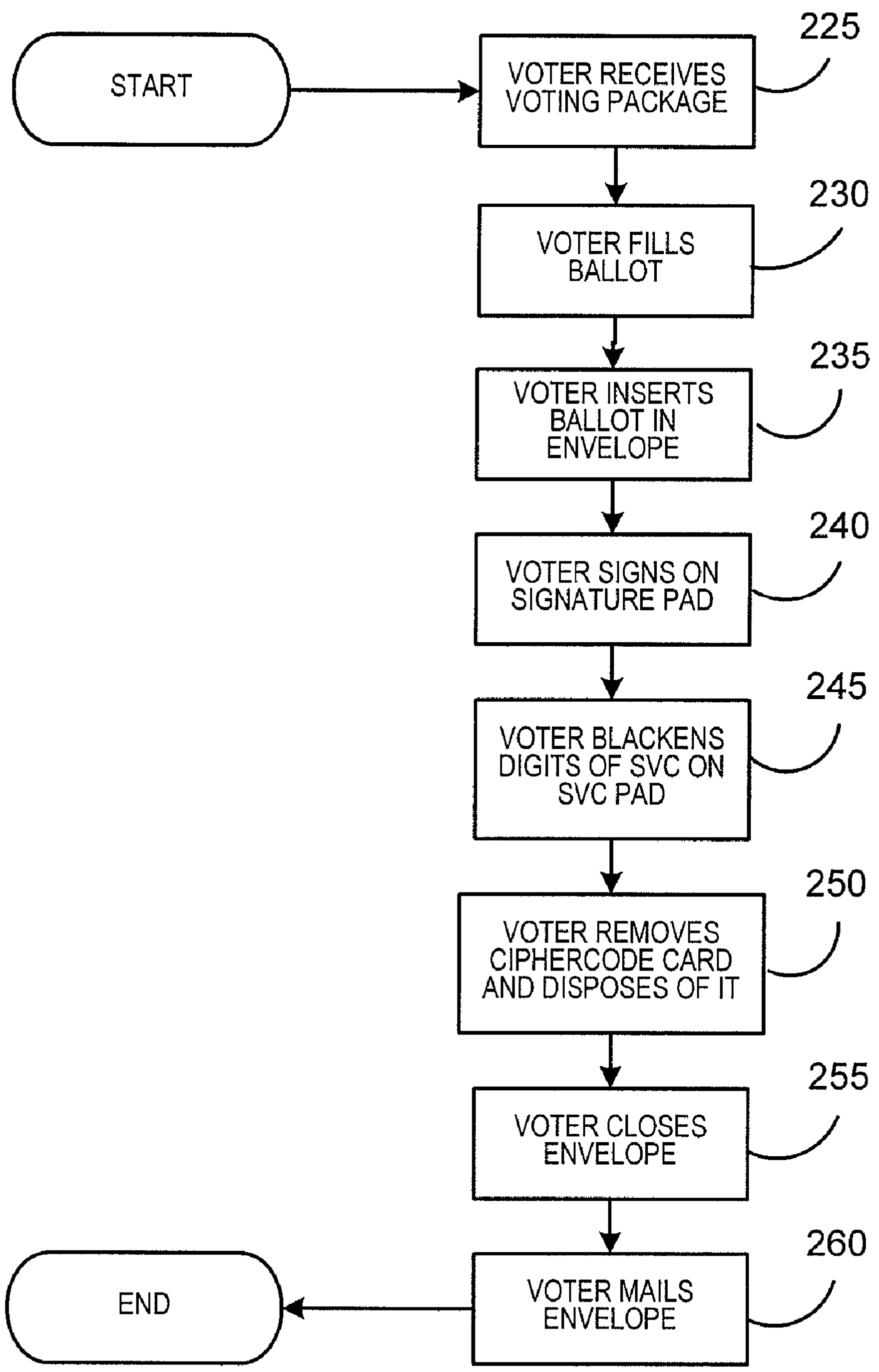
FIG. 10 is a flowchart illustrating the steps taken by a voter in order to cast his or her votes in the vote by mail system of the present invention using the return envelope embodiment shown in FIGS. 1-7.

FIG. 10 is a flowchart illustrating the steps taken by a voter in order to cast his or her votes in the vote by mail system of the present invention using the return envelope 100 embodiment shown in FIGS. 1-7. At step 225, the voter receives in the mail the voting package that was mailed by the BSA which includes the ballot (or possibly ballots) 160 and the return envelope 100. The return envelope 100 that is received by the voter in step 225 includes the ciphercode card 135 that was generated for the voter by the CVRA. Next, at step 230, the voter completes the ballot 160. At step 235, the voter inserts the completed ballot 160 into the return envelope 100 as shown in FIG. 4. Next, at step 240, the voter signs the signature pad 120. Then, at step 245, the voter darkens the blocks of the SVC-pad 130 that include the digits of the voter's SVC as shown in FIG. 2. At step 250, the voter removes the ciphercode card 135 as shown in FIG. 3 and either disposes of it or, alternatively, retains it as a souvenir. As an alternative, the voter may perform step 235, i.e., inserting the completed ballot 160 into the return envelope 100, following step 250 as opposed to prior to step 240. At step 255, the voter closes the return envelope 100 as shown in FIG. 5 and thereafter, at step 260, mails the return envelope 100 to the VVA at the address provided on the front of the return envelope 100 (FIG. 7).

Figure 11:
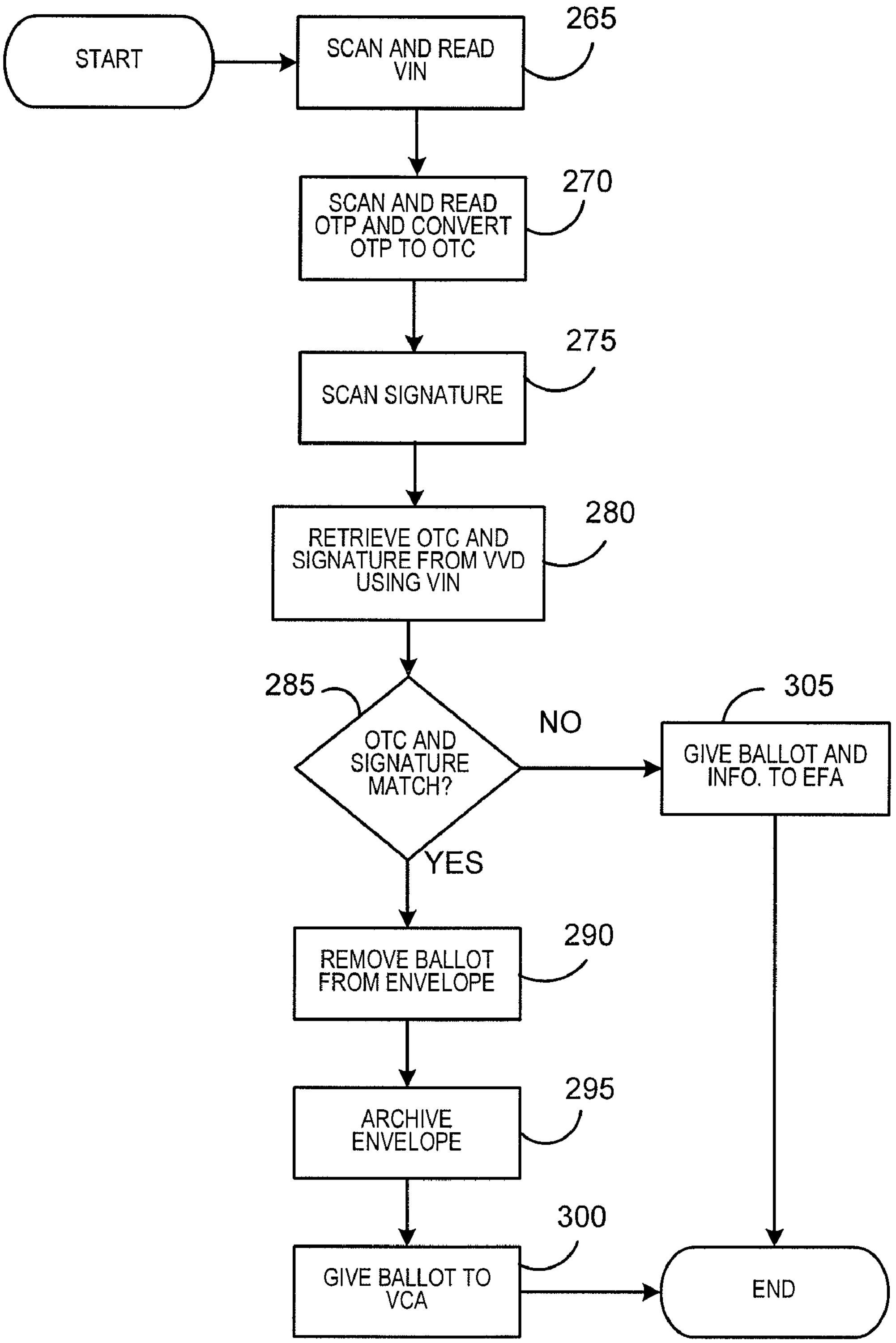
FIG. 11 is a flowchart illustrating the steps performed in order to verify the authenticity of the ballots that are received from the voters in the vote by mail system of the present invention using the return envelope embodiment shown in FIGS. 1-7.

FIG. 11 is a flowchart illustrating the steps performed by the VVA in order to verify the authenticity of the ballots 160 that are received from the voters. FIG. 11 shows the steps that are performed in connection with one particular return envelope 100 received from a voter, but it will be understood that the same steps are performed for the return envelope 100 received from each of the voters voting in the election. At step 265, the VVA scans the return envelope 100 in order to read the VIN 170 therefrom. In the embodiment of the return envelope 100 shown in FIG. 6 wherein the VIN 170 is in the form of a two-dimensional barcode, the VVA will employ a barcode reader in order to scan and read the VIN 170. At step 270, the VVA scans the return envelope 100 through the window 145 in order to obtain an image of the SVC-pad 130 including the darkened array. In other words, the VVA scans and reads the OTP from the return envelope 100. In addition, using an appropriate software routine, the VVA converts the OTP into the OTC, preferably in the manner shown in connection with FIG. 8 and described elsewhere herein. At step 275, the VVA scans the signature from the signature pad 120 through the window 125 of the return envelope 100. In the embodiment of the return envelope 100 shown in FIGS. 1-7, this step will preferably include exposing the window 125 to conditions which make it transparent (such as ultra-violet light). Next, at step 280, the VVA retrieves from the VVD the OTC and signature of the voter using the VIN 170 scanned in step 265. As described elsewhere herein, the OTC and signature stored in the VVD were supplied by the CVRA. At step 285, a determination is made as to whether the OTC generated from the scanned OTP and the scanned signature match the OTC and signature obtained from the VVD. If the answer at step 285 is yes, then, at step 290, the ballot 160 is removed from the return envelope 100 and, optionally at step 295, the empty return envelope 100 is archived for possible later use (preferably for an amount of time required by the jurisdiction in which the election is being held). At step 300, the ballot 160 is then given to the VCA so that the votes contained thereon can be counted and stored in the VCD that is maintained by the VCA. If, however, the answer at step 285 is no, meaning that either or both of the OTC obtained from the scanned OTP and the scanned signature do not match their stored counterparts, then, at step 305, the VVA provides the return envelope 100, including the ballot 160, to the EFA with a description of the problem.

When the EFA receives a return envelope 100 as described above (step 305), it may retrieve the voter's name, address and phone number from the EFA and contact the voter to investigate the problem. A number of possible situations may exist which would lead to a return envelope 100 and ballot 160 being provided to the EFA, with each situation having an appropriate course of investigative action taken by the EFA. For example, if the voter's signature is missing from the return envelope 100, legislation in many jurisdictions would require the EFA to contact the voter and have him or her come to the registrar's office to sign the return envelope 100. If the OTP is missing from the return envelope 100, but the signature is present, the EFA may determine that the signature is valid and return the return envelope to the VVA so that the ballot can be counted. This course of action would be taken if the jurisdiction has decided in advance that the OTC is merely optional and that a valid signature will be sufficient in order to count a ballot 160. If several return envelopes 100 are received, all with the correct signature and all but one with an incorrect OTP, the return envelope 100 having the correct OTP may be considered to be valid and the ballot 160 contained therein may be counted, with the other ballots 160 contained in the other return envelopes 100 being discarded. In this case, it might be preferable to have the EFA contact the voter in order to verify that the voter had indeed submitted multiple return envelopes 100 within the intent that only one be counted. In the event that several return envelopes 100 are received that include both a correct signature and a correct OTP, the last such return envelope 100 may be considered to be valid and the ballot 160 included therein may be the only ballot 160 that is counted. However, in this situation, it is still preferable for the EFA to contact the voter in order to verify that multiple return envelopes 100 were indeed returned.

The SVC and OTC concepts described herein are advantageous over a secure electronic password system that has been employed in the prior art for a number of reasons. First, if a fraudster uses some kind of brute force attack by sending multiple ballots 160 with all of the possible SVC/OTC combinations, or at least a large number of the most probable ones, this will trigger an alarm at the VVA because so many ballots 160 for the same voter are received, and an investigation by EFA will be commenced. This is in contrast with many electronic password brute force attacks (searching the password space ordered from higher to lower probability) that can be conducted completely inconspicuously. In addition, in most electronic password attacks, each trial does not cost anything and therefore the attack can be conducted on a very large scale. In the vote by mail system of the present invention, the voter has to pay for the postage for mailing each ballot 160. A large scale attack would therefore be costly. This cost paired with a low chance of success is a significant deterrent to fraud. This is analogous to the difference between email spam and physical mail spam.

Thus, the present invention discourages vote selling and protects legitimate voters from coercers by allowing the voter to set up a secret code, the SVC, at registration time. This secret code is used on the returning mail piece, the return envelope 100 that includes the completed ballot 160, together with the voter's signature, to authenticate the voter. Since the secret code is known only to the voter, a buyer or coercer cannot be sure that the SVC that a voter uses to generate a return envelope 100 is the good one. The voter always has the possibility of privately voting one more time using the voters real SVC, thereby discouraging buyers and coercers.

Figure 12:
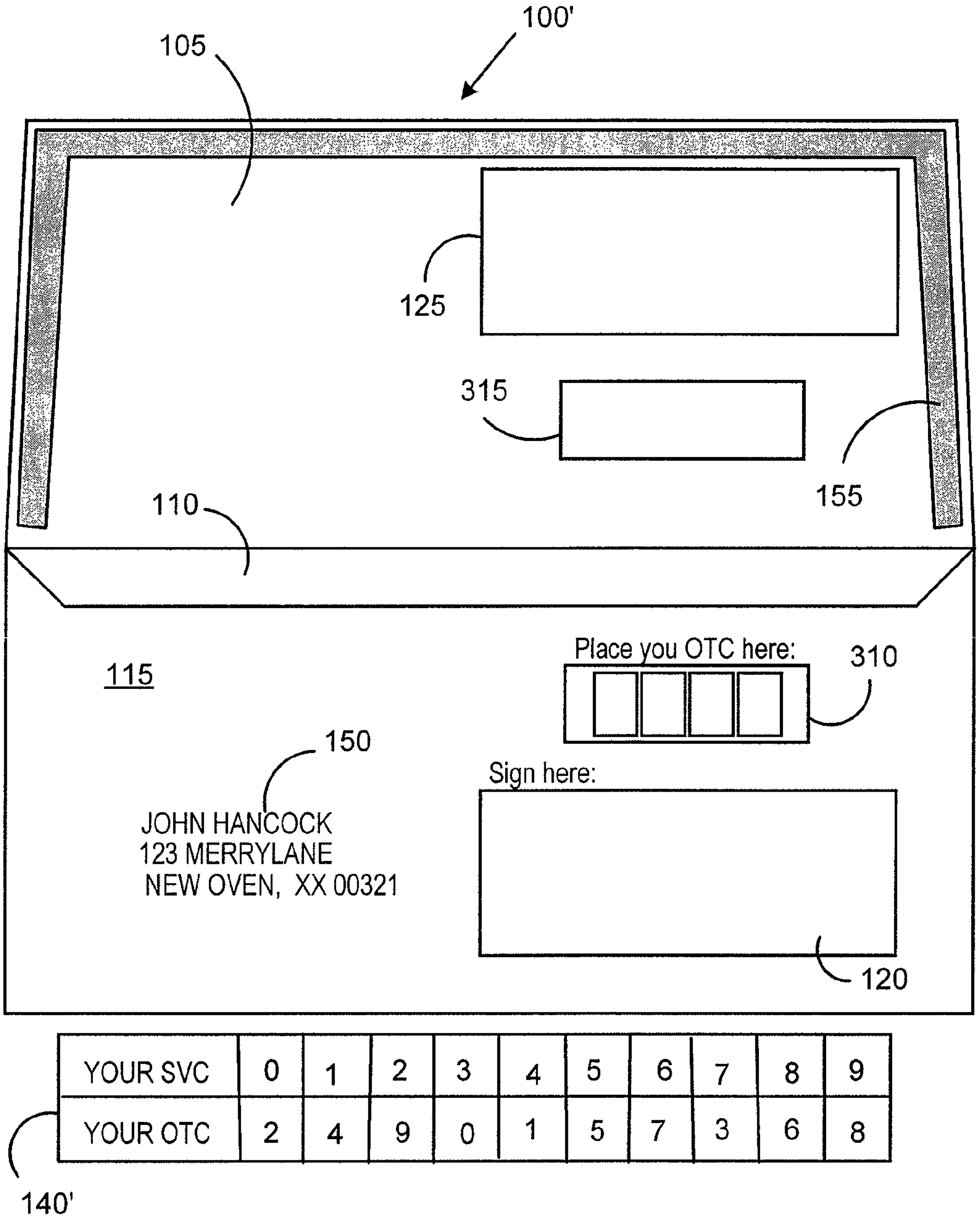
FIGS. 12-14 show a return envelope according to an alternative embodiment of the present invention.
Figure 13:
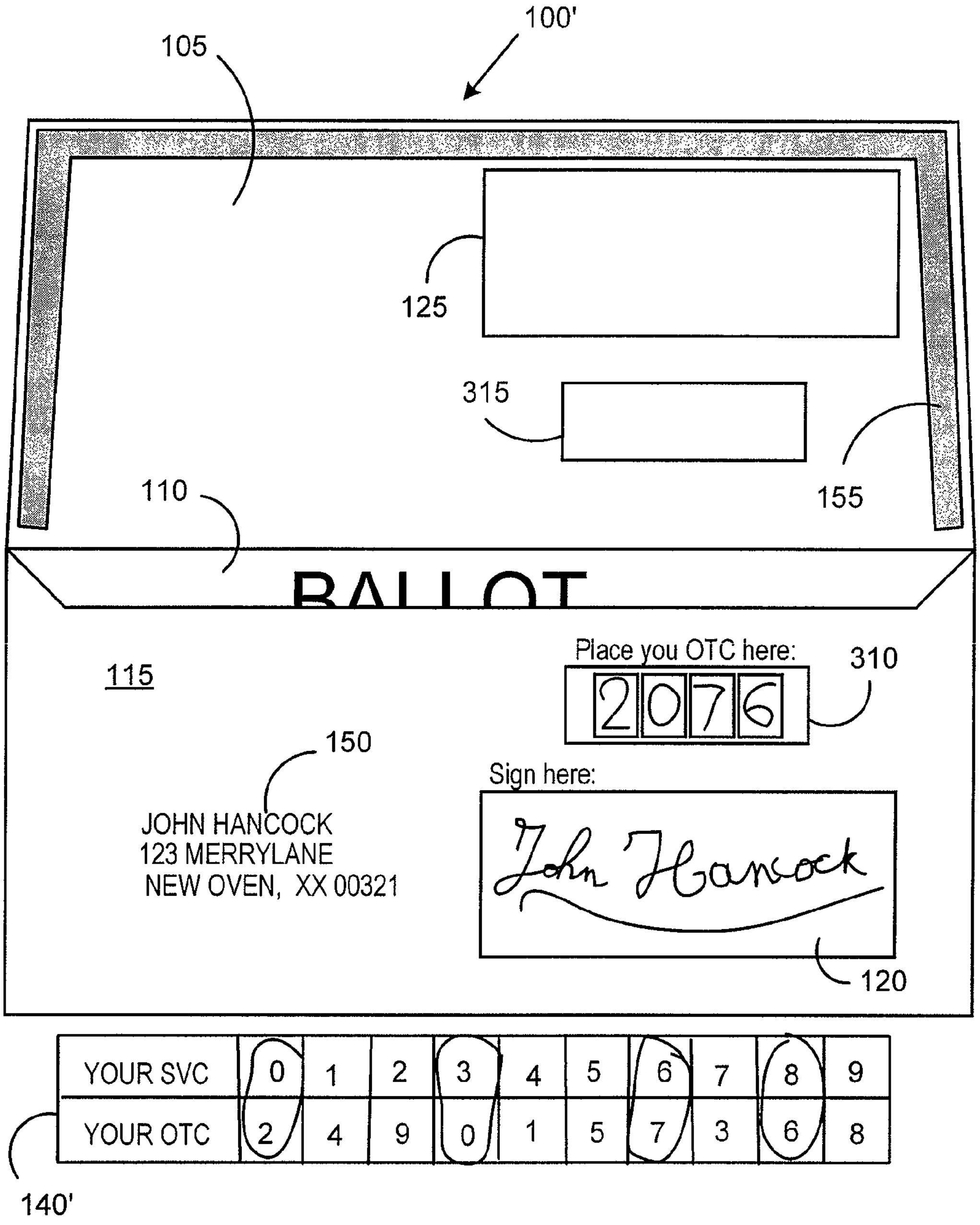
Figure 14:
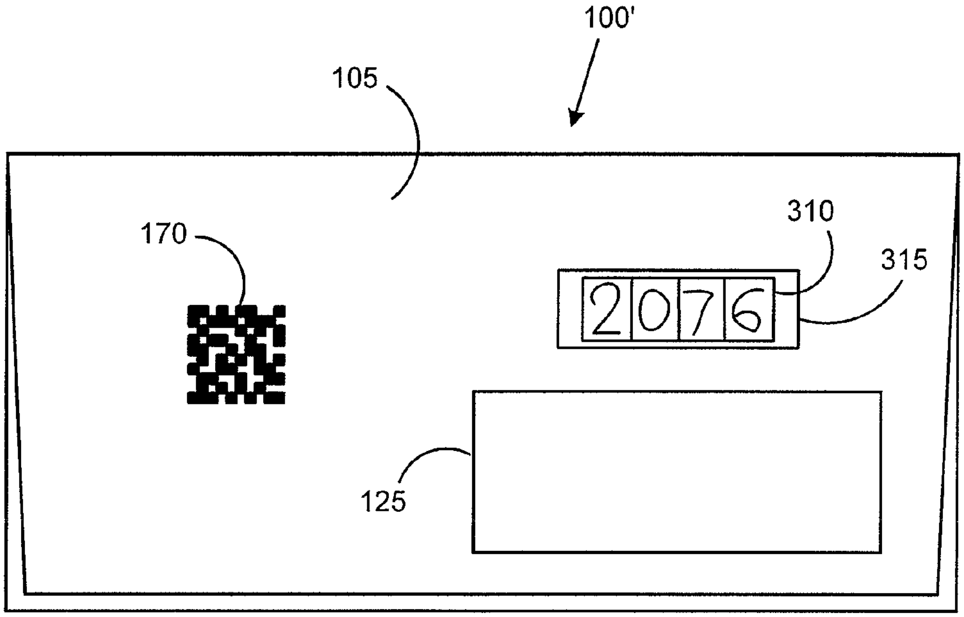

FIGS. 12-14 show a return envelope 100' according to an alternative embodiment of the present invention. The return envelope 100' contemplates an alternative translating mechanism 140' for converting the voter's SVC directly into an OTC for the voter. In particular, as shown in FIGS. 12 and 13, the voting package that is sent to the voter that includes the return envelope 100' and a ballot 160 would also include a translating mechanism 140' in the form of a card that maps each possible digit of the voter's SVC to a corresponding OTC digit. As seen in FIG. 12, the card would preferably include on a top line thereof each digit 0-9 for the SVC and on a bottom line thereof the digits 0-9 randomly sequenced for the OTC. During the voting process, the voter would sign his or her name on the signature pad 120 and would convert his or her SVC to the corresponding OTC using the translating mechanism 140' to determine the digits of the OTC (in the example shown in FIG. 13, an SVC of 0368 is translated into an OTC of 2076). The voter would then write the OTC on the OTC pad 310 provided on the back 115 of the return envelope 100'. Thereafter, the voter would fold the flap 105 down to seal the return envelope 100'. As seen in FIG. 14, when this is done, the window 125 would cover and obscure the signature pad 120, and a transparent window 315 provided on the flap 105 would cover the OTC pad 310 so that the OTC could thereafter be scanned through the window 315 during the vote verification process as described elsewhere herein. As seen in FIGS. 12-14, the return envelope 100' includes a number of the same components as the return envelope 100, and those components are labeled with like reference numerals.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of enabling a voter having a secret vote code to vote in a vote by mail election, comprising:

translating the secret vote code of said voter into a one-time code valid only for said election;

storing said one-time code;

mailing a voting package to said voter, the voting package including at least one ballot, a return envelope, and a mechanism for enabling the voter to translate the voter's secret vote code into a translated format;

receiving the return envelope from the voter, the return envelope received from the voter including the at least one ballot completed by the voter, the voter's signature, and the translated format of the voter's secret vote code;

determining whether the voter's signature obtained from the return envelope matches a stored version of said voter's signature;

obtaining a second one-time code based on said translated format obtained from the return envelope and determining whether said second one-time code matches said stored one-time code; and counting the at least one ballot completed by the voter in said election only if it is determined that: (i) the voter's signature obtained from the return envelope matches said stored version of said voter's signature, and (ii) the second one-time code matches said stored one-time code.

2. The method according to claim 1, wherein obtaining a second one-time code based on said translated format comprises translating the translated format into the second one-time code.

3. The method according to claim 2, wherein said translated format comprises a pattern provided on said return envelope, said pattern being generated by said voter using said mechanism and the voter's secret vote code.

4. The method according to claim 3, wherein said return envelope includes a pad provided on a surface of said return envelope, said pad having an array comprising a plurality of blocks arranged in a plurality of block rows and block columns, and wherein said pattern comprises a number of said blocks that have been darkened by said voter.

5. The method according to claim 4, wherein said voter's secret vote code comprises a first sequence of digits, wherein said mechanism includes a card having a plurality of card digits provided thereon, said card digits being arranged in an array including a plurality of card rows and a plurality of card columns, wherein said pad is transparent and ink absorbing and is structured to receive said card underneath the pad such that each of said card digits is aligned with a respective one of said blocks, wherein said blocks that have been darkened by said voter comprise one block from each block column, wherein the one block from each respective block column is aligned with a card digit that is the same as a respective one of the digits of the first sequence of digits.

6. The method according to claim 5, further comprising generating said card for said voter including choosing an arrangement of said card digits in said array of said card digits, wherein said step of translating the secret vote code of said voter into a one-time code comprises using said arrangement of said card digits and the secret vote code of the voter to generate said one-time code.

7. The method according to claim 5, wherein when said return envelope is mailed to said voter said card is provided underneath said pad, wherein when the return envelope is received from the voter said card has been removed from underneath said pad.

8. The method according to claim 1, wherein said return envelope includes a flap having a transparent window structured to cover said translated format of the voter's secret vote code when said return envelope is closed.

9. The method according to claim 8, wherein said return envelope includes a signature pad on which the voter's signature is provided, and wherein said return envelope includes a flap structured to obscure said pad and the voter's signature under certain predetermined conditions.

10. The method according to claim 1, wherein said voter has a voter serial number, the method further comprising generating a voter identification number from said voter serial number, said voter identification number being valid only for said election, wherein said stored version of said voter's signature and said stored one-time code are stored in association with said voter identification number, wherein the return envelope received from the voter includes the voter identification number, the method further comprising obtaining the voter identification number from the return envelope and using the obtained voter identification number to access said stored version of said voter's signature and said stored one-time code.

11. The method according to claim 1, wherein said translated format is said second one-time code.

12. The method according to claim 11, wherein said mechanism comprises a key for translating the voter's secret vote code into said second one-time code.

13. The method according to claim 12, wherein said key maps each one of a first set of digits associated with said voter's secret vote code to a corresponding one of a second set of digits associated with said second one-time code.

14. The method according to claim 12, wherein said step of translating the secret vote code of said voter into a one-time code comprises using said key and the secret vote code of the voter to generate said one-time code.

15. A return envelope for enabling a voter having a secret vote code to return a completed ballot in a vote by mail election, comprising:

a signature pad on which said voter may provide a signature;

a mechanism for enabling the voter to translate the voter's secret vote code into a translated format which may used by a voting authority to obtain a one-time code valid only for said election, said one-time code matching a stored one-time code stored by said voting authority and obtained by said voting authority from said voter's secret vote code.

16. The return envelope according to claim 15, wherein said translated format comprises a pattern provided on said return envelope, wherein said mechanism enables said voter to generate said pattern based on the voter's secret vote code.

17. The return envelope according to claim 16, wherein said mechanism includes a pad provided on a surface of said return envelope, said pad having an array comprising a plurality of blocks arranged in a plurality of block rows and block columns, and wherein said voter generates said pattern by darkening a number of said blocks.

18. The return envelope according to claim 17, wherein said voter's secret vote code comprises a first sequence of digits, wherein said mechanism further includes a card having a plurality of card digits provided thereon, said card digits being arranged in an array including a plurality of card rows and a plurality of card columns, wherein said pad is transparent and ink absorbing and is structured to receive said card underneath the pad such that each of said card digits is aligned with a respective one of said blocks.

19. The return envelope according to claim 18, wherein when said voter generates said pattern by darkening a number of said blocks, the blocks that have been darkened by said voter comprise one block from each block column, wherein the one block from each respective block column is aligned with a card digit that is the same as a respective one of the digits of the first sequence of digits.

20. The return envelope according to claim 18, wherein the card digits in each of said card columns comprise the digits 0 through 9.

21. The return envelope according to claim 20, wherein the card digits in each of said card columns comprise the digits 0 through 9 arranged in an order selected by the voting authority.

22. The return envelope according to claim 18, wherein the pad is structured to enable said card to be removed from underneath the pad by said voter.

23. The return envelope according to claim 15, further comprising a flap having a transparent window structured to cover said translated format of the voter's secret vote code when said return envelope is closed, and wherein said flap is structured to obscure said pad and the voter's signature under certain predetermined condition when said return envelope is closed.

24. The return envelope according to claim 15, wherein said voter has a voter serial number, and wherein the return envelope includes a voter identification number generated from said voter serial number, said voter identification number being valid only for said election.

25. The return envelope according to claim 15, wherein said translated format is said one-time code, wherein said mechanism comprises a key for translating the voter's secret vote code into said one-time code, and wherein said key maps each one of a first set of digits associated with said voter's secret vote code to a corresponding one of a second set of digits associated with said one-time code.

* * * * *